E. SCHNEIDER.
JOINT FOR TELESCOPIC TUBES.
APPLICATION FILED AUG. 21, 1918.

1,309,963.

Patented July 15, 1919.

KNOWN CONSTRUCTION

Inventor
Eugene Schneider
by
Mauro Cameron Lewis & Massie
Attorneys

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

JOINT FOR TELESCOPIC TUBES.

1,309,963.    Specification of Letters Patent.    Patented July 15, 1919.

Application filed August 21, 1918. Serial No. 250,866.

*To all whom it may concern:*

Be it known that I, EUGÈNE SCHNEIDER, citizen of the French Republic, residing at 42 Rue d'Anjou, Paris, France, have invented certain new and useful Improvements in Joints for Telescopic Tubes, of which the following is a specification.

In telescopic ducts for distributing fluids under pressure, for the purpose of making as far as possible a tight joint between a fixed element of the duct and the movable element slidable over the said fixed element, it has already been proposed to subdivide the fixed tube near the movable tube into two elements connected together by a ball and socket joint.

Figure 1:
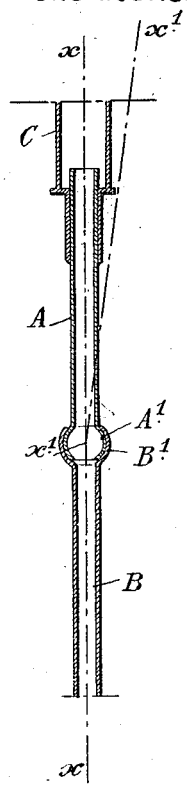

This known arrangement is illustrated diagrammatically in Figure 1 of the accompanying drawings.

In this diagram, C indicates the movable tube of the telescopic duct. Since the tube C may get more or less out of its axis in its longitudinal to-and-fro movements, the fixed tube is subdivided into two elements A and B which are connected by a ball and socket joint $A^1$, $B^1$. By this means the axis $x-x$ of the movable tube C is allowed to assume an inclined position, by moving with it in its inclination the element A of the fixed tube; the tightness of the joint between C and A remaining assured.

In this known arrangement, while the permanency of the tightness of the joint between the movable tube C and the element A of the fixed tube is assured, yet on the other hand it is difficult to insure the tightness of the joint between the two elements A and B of the said fixed tube, because the element A has a tendency to be carried along in the longitudinal movements of the tube C which slides on it, and to be lifted by the pressure of the fluid entering through the element B.

Further, the spherical joint is subjected to abnormal strains when the tube C, carrying the element A with it, tends to move parallelly to itself.

The present invention has for its object to provide an improved joint for telescopic tubes wherein these drawbacks are obviated.

Figure 2:
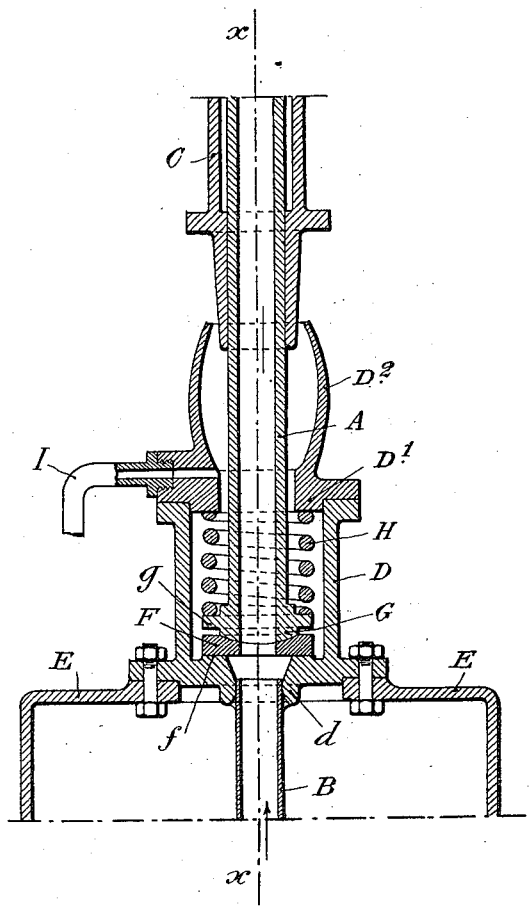

One constructional form of this invention is illustrated in Fig. 2 of the accompanying drawings which is a longitudinal section of an apparatus embodying an improved joint according to the present invention.

In the said Fig. 2, C is the lower end of the tube which is capable of longitudinal to-and-fro movements along a fixed tube that is subdivided into two elements A and B, A being the tube element along which the movable tube C is slidable.

The improved joint between the elements A and B comprises a member which is shown as a box D attached by any suitable means to a framing E or any suitable fixed part of an apparatus employing a distribution of fluid under pressure through telescopic tubes. The lower end of this box D is formed with a union neck $d$ for the engagement of the tube element B, and it serves as an abutment for the flat lower surface $f$ of a washer F of plano-concave lenticular shape, the concave upper face of which serves in its turn as a support for a head G of corresponding convexity formed or secured on the lower end of the tubular element A. H is a coiled spring which bears at its upper end against the underside of the cover or upper end $D^1$ of the box D, and at its lower end upon a flange $g$ formed on the head G.

The internal diameter of the box D is such that the washer F can move therein with a suitable amount of play by sliding on its supporting face $f$. The strength of the spring H is made such as to oppose any rising movement of the washer F due to the pressure of the fluid entering through the tube B.

The tube element A can assume any inclined position in any direction relatively to the element B owing to the spherical joint between the head G and the washer F, while lateral displacements of the tube element A at right angles to its axis are possible owing to the sliding of the whole of the head G and washer F on the end or bottom of the box D.

The upper end $D^1$ of the box D may, as shown in the drawing, have a hollow extension $D^2$ shown as having the form of a cup or funnel for receiving any small quantities of liquid that may leak past the joint. This leakage is discharged through a pipe I.

The more important and characteristic feature of the improved movable joint resides in the fact that one of the elements of the spherical joint, instead of being formed directly upon the tube element B, or upon a fixed member attached to the latter element, is formed on a washer F which is capable of limited movement on a flat support fixed to the tube element B, the contact of the complementary element of the said joint being assured by a spring, one of the abutments of which is fixed.

It is to be understood that the washer F may also consist of a plano-convex washer upon the convex face of which a head of corresponding concavity is arranged to bear.

Having now described my invention what I claim as new and desire to secure by Letters Patent is:

1. In a telescopic duct, in combination with a relatively stationary tube element and a relatively movable tube element, a joint between said elements comprising a member on said stationary element provided with a flat surface, a head on said movable element provided with a curved surface, a washer between said member and head provided with a flat surface designed to engage and slide on said first-mentioned flat surface, and a mating curved surface designed to engage said first-mentioned curved surface and permit relative movement therebetween, and means to hold said engaging surfaces in operative contact while permitting said relative movement therebetween.

2. In a telescopic duct, in combination with a relatively sationary tube element and a relatively movable tube element, a joint between said elements comprising a box on said stationary element provided with an interior flat surface, a head on said movable element provided with a curved surface, a washer between said box and head provided with a flat surface designed to engage and slide on said first-mentioned flat surface and a mating curved surface designed to engage said first-mentioned curved surface and permit relative movement therebetween, and a spring between said box and head having a constant tendency to maintain said engaging surfaces in operative contact while permitting said relative movement therebetween.

3. In a telescopic duct, in combination with a relatively stationary tube element and a relatively movable tube element, a joint between said elements comprising a box on said stationary element provided with an interior flat surface, a head on said movable element provided with a curved surface, a washer between said box and head provided with a flat surface designed to engage and slide on said first mentioned flat surface and a mating curved surface designed to engage said first-mentioned curved surface and permit relative movement therebetween, means to hold said engaging surfaces in operative contact while permitting said relative movement therebetween, a hollow extension on said box for receiving fluid leaking past said joint, and a discharge pipe leading from said hollow extension.

4. In combination with a stationary tube element and a relatively movable tube element, a joint between said element comprising a washer provided with a flat surface and a curved surface, a member on said stationary element provided with a flat surface on which the flat surface of said washer is designed to slide, a head on said movable element provided with a curved surface mating with the curved surface on said washer, and means for holding said flat and curved surfaces respectively in engagement while permitting said washer to slide laterally on said member and said head to move angularly with respect to said washer.

5. In combination with a stationary tube element and a relatively movable tube element, a joint between said elements comprising a washer provided with a flat surface and a curved surface, a box on said stationary element provided with an interior flat surface on which the flat surface of said washer is designed to slide, a head on said movable element provided with a curved surface mating with the curved surface on said washer, and a spring between said head and said box having a constant tendency to maintain said flat and curved surfaces respectively in engagement while permitting said washer to slide laterally in said box and said head to move angularly with respect to said washer.

In testimony whereof I have affixed my signature in presence of two witnesses.

EUGÈNE SCHNEIDER.

Witnesses:
  ANDRÉ MOSTICKER,
  JOHN F. SIMONS.

Copies of this patent may be obtained for five cents each, by addressing the "Commissioner of Patents, Washington, D. C."